US012702623B1

(12) United States Patent
Vitello et al.

(10) Patent No.: US 12,702,623 B1
(45) Date of Patent: Aug. 11, 2026

(54) TAMPER EVIDENT VIAL CLOSURE ASSEMBLY

(71) Applicant: MEDICAL DEVICE ENGINEERING, LLC, Pompano Beach, FL (US)

(72) Inventors: Jonathan Vitello, Fort Lauderdale, FL (US); Patrick Vitello, Pompano Beach, FL (US); Panagiotis Peter Vassios, Hypoluxo, FL (US)

(73) Assignee: MEDICAL DEVICE ENGINEERING, LLC, Pompano Beach, FL (US)

( * ) Notice: Subject to any disclaimer, the term of this patent is extended or adjusted under 35 U.S.C. 154(b) by 252 days.

(21) Appl. No.: 18/377,231

(22) Filed: Oct. 5, 2023

Related U.S. Application Data

(60) Provisional application No. 63/413,492, filed on Oct. 5, 2022.

(51) Int. Cl.
*A61J 1/18* (2023.01)
*A61J 1/14* (2023.01)

(52) U.S. Cl.
CPC ............... *A61J 1/18* (2013.01); *A61J 1/1406* (2013.01); *A61J 1/1412* (2013.01)

(58) Field of Classification Search
CPC ........... A61J 1/1412; A61J 1/1406; A61J 1/18
USPC .......................................... 206/807; 220/200
See application file for complete search history.

(56) References Cited

U.S. PATENT DOCUMENTS 722,943 A 3/1903 Chappell
732,662 A 6/1903 Smith
1,678,991 A 7/1928 Marschalek
1,970,631 A 8/1934 Sherman
2,186,888 A 1/1940 Tular et al.
2,277,936 A 3/1942 Rosenblatt
2,459,304 A 1/1949 Blank
2,477,598 A 8/1949 Hain
2,734,665 A 2/1956 Flamm
(Continued)

FOREIGN PATENT DOCUMENTS

CN 110589435 12/2019
DE 202008018507 2/2015
(Continued)

OTHER PUBLICATIONS

Arai Tsugio, Pilfering Proof Cap, Jan. 9, 1996.

*Primary Examiner* — Rafael A Ortiz

(74) *Attorney, Agent, or Firm* — Malloy & Malloy, P.L.; Jennie S. Malloy

(57) ABSTRACT

A closure assembly for a vial including a cap and a septum attached thereto. The septum includes a needle penetrable access portion. A seal member overlies the septum and includes a seal portion disposed in removably sealing relation to the access portion. An indicator member includes first and second segments detachably connected to one another, wherein the first segment is fixedly connected to the cap and movable therewith, concurrent to removal of said cap from the vial. The second segment is movably disposed, within an interior of said cap, in a retained position on the vial when connected to the first segment and is movable into an exposed, tamper evident position on the vial, concurrent to an initial removal of said cap from the vial and detachment of the first and second segments.

15 Claims, 6 Drawing Sheets

(56) References Cited

U.S. PATENT DOCUMENTS 2,739,590 A 3/1956 Yochem
2,811,283 A 10/1957 Bowen
2,823,674 A 2/1958 Yochem
2,834,346 A 5/1958 Adams
2,875,761 A 3/1959 Helmer et al.
2,888,015 A 5/1959 Hunt
2,952,255 A 9/1960 Hein, Jr.
3,122,280 A 2/1964 Goda
3,180,532 A 4/1965 Michel
3,245,567 A 4/1966 Knight
3,301,256 A 1/1967 Cowley
3,323,798 A 6/1967 Miller
3,364,890 A 1/1968 Andersen
3,368,673 A 2/1968 Johnson
3,489,268 A 1/1970 Meierhoefer
3,568,673 A 3/1971 Cowley
3,574,306 A 4/1971 Alden
3,598,120 A 8/1971 Mass
3,610,241 A 10/1971 LeMarie
3,674,181 A 7/1972 Marks et al.
3,700,215 A 10/1972 Hardman et al.
3,706,307 A 12/1972 Hasson
3,710,922 A 1/1973 Lanphere et al.
3,712,749 A 1/1973 Roberts
3,726,445 A 4/1973 Ostrowsky et al.
3,730,325 A 5/1973 Goodwin
3,747,751 A 7/1973 Miller et al.
3,850,329 A 11/1974 Robinson
3,872,867 A 3/1975 Killinger
3,904,033 A 9/1975 Haerr
3,905,375 A 9/1975 Toyama
3,937,211 A 2/1976 Merten
3,987,930 A 10/1976 Fuson
4,005,739 A 2/1977 Winchell
4,027,669 A 6/1977 Johnston et al.
4,043,334 A 8/1977 Brown et al.
4,046,145 A 9/1977 Choksi et al.
4,068,696 A 1/1978 Winchell
4,085,845 A 4/1978 Perfect
4,106,621 A 8/1978 Sorenson
4,216,585 A 8/1980 Hatter
4,216,872 A 8/1980 Bean
4,220,151 A 9/1980 Whitney
4,244,366 A 1/1981 Raines
4,252,122 A 2/1981 Halvorsen
4,271,972 A 6/1981 Thor
4,286,591 A 9/1981 Raines
4,286,640 A 9/1981 Knox et al.
4,313,539 A 2/1982 Raines
4,369,781 A 1/1983 Gilson et al.
4,420,085 A 12/1983 Wilson et al.
4,430,077 A 2/1984 Mittleman et al.
4,433,790 A 2/1984 Gibson
4,457,445 A 7/1984 Hanks et al.
4,482,071 A 11/1984 Ishiwatari
D277,783 S 2/1985 Beck
4,520,942 A 6/1985 Dwinell
4,521,237 A 6/1985 Logothetis
4,530,437 A 7/1985 Gray et al.
4,530,697 A 7/1985 Kuhlemann et al.
4,558,554 A 12/1985 Herbert
4,571,242 A 2/1986 Klien et al.
4,589,171 A 5/1986 McGill
4,608,646 A 8/1986 Goodrich et al.
4,664,259 A 5/1987 Landis
4,667,837 A 5/1987 Vitello et al.
4,676,530 A 6/1987 Nordgren et al.
4,693,707 A 9/1987 Dye
4,726,483 A 2/1988 Drozd
4,735,617 A 4/1988 Nelson et al.
4,742,910 A 5/1988 Staebler
4,743,229 A 5/1988 Chu
4,743,231 A 5/1988 Kay et al.
4,744,455 A 5/1988 Dragotta et al.
4,753,345 A 6/1988 Goodsir et al.
4,760,847 A 8/1988 Vaillancourt
4,784,493 A 11/1988 Turcheck, Jr. et al.
4,813,564 A 3/1989 Cooper et al.
4,819,784 A 4/1989 Sticht
4,832,695 A 5/1989 Rosenberg et al.
4,834,706 A 5/1989 Beck et al.
4,842,592 A 6/1989 Caggiani et al.
4,844,906 A 7/1989 Hermelin et al.
4,863,451 A 9/1989 Marder
4,906,231 A 3/1990 Young
4,919,285 A 4/1990 Roof et al.
4,936,445 A 6/1990 Grabenkort
5,007,535 A 4/1991 Meseke et al.
5,009,323 A 4/1991 Montgomery et al.
5,024,323 A 6/1991 Bolton
5,049,129 A 9/1991 Zdeb et al.
5,057,093 A 10/1991 Clegg et al.
D323,392 S 1/1992 Bryne
5,078,696 A 1/1992 Nedbaluk
5,085,332 A 2/1992 Gettig et al.
5,090,564 A 2/1992 Chimienti
5,119,975 A 6/1992 Jemielita
5,133,454 A 7/1992 Hammer
5,135,496 A 8/1992 Vetter et al.
5,148,652 A 9/1992 Herzog
5,163,922 A 11/1992 McElveen, Jr. et al.
5,165,560 A * 11/1992 Ennis, III ............. B65D 51/002 215/274
5,230,429 A * 7/1993 Etheredge, III ..... B65D 51/002 206/459.1
5,236,077 A 8/1993 Hoppmann et al.
5,267,983 A 12/1993 Oilschlager et al.
5,292,308 A 3/1994 Ryan
5,293,993 A 3/1994 Yates, Jr. et al.
5,295,599 A 3/1994 Smith
5,312,367 A 5/1994 Nathan
5,312,368 A 5/1994 Haynes
5,316,163 A * 5/1994 von Schuckmann ........................ B65D 51/002 215/277
5,328,466 A 7/1994 Denmark
5,328,474 A 7/1994 Raines
5,332,113 A 7/1994 Kusler, III et al.
5,356,380 A 10/1994 Hoekwater et al.
5,370,226 A 12/1994 Gollobin et al.
5,380,295 A 1/1995 Vacca
5,402,887 A 4/1995 Shillington
5,405,339 A 4/1995 Kohnen et al.
5,456,668 A 10/1995 Ogle, II
5,458,580 A 10/1995 Hajishoreh
5,468,224 A 11/1995 Souryal
5,474,178 A 12/1995 DiViesti et al.
5,484,413 A 1/1996 Gevorgian
5,505,705 A 4/1996 Galpin et al.
5,531,695 A 7/1996 Swisher
5,540,324 A 7/1996 Knapp
5,540,666 A 7/1996 Barta et al.
5,549,571 A 8/1996 Sak
5,558,648 A 9/1996 Shields
5,584,817 A 12/1996 van den Haak
5,588,239 A 12/1996 Anderson
5,611,445 A 3/1997 Kano et al.
5,617,954 A 4/1997 Kato et al.
5,624,402 A 4/1997 Imbert
5,662,233 A 9/1997 Reid
5,674,209 A 10/1997 Yarger
5,695,470 A 12/1997 Roussigne et al.
5,699,913 A 12/1997 Richardson
5,700,247 A 12/1997 Grimard et al.
5,702,374 A 12/1997 Johnson
5,706,985 A 1/1998 Feer
5,711,443 A 1/1998 Bennett
5,713,485 A 2/1998 Liff et al.
5,776,124 A 7/1998 Wald
5,785,691 A 7/1998 Vetter et al.
5,797,885 A 8/1998 Rubin
5,807,343 A 9/1998 Tucker et al.
5,829,589 A 11/1998 Nguyen et al.
D402,766 S 12/1998 Smith et al.

(56) References Cited

U.S. PATENT DOCUMENTS

| | | | | |
|---|---|---|---|---|
| 5,842,567 | A | 12/1998 | Rowe et al. | |
| 5,876,381 | A | 3/1999 | Pond et al. | |
| 5,883,806 | A | 3/1999 | Meador et al. | |
| 5,884,457 | A | 3/1999 | Ortiz et al. | |
| 5,901,866 | A | 5/1999 | Storar | |
| 5,902,269 | A | 5/1999 | Jentzen | |
| 5,926,922 | A | 7/1999 | Stottle | |
| 5,951,522 | A | 9/1999 | Rosato et al. | |
| 5,951,525 | A | 9/1999 | Thorne et al. | |
| 5,954,203 | A | 9/1999 | Marconi | |
| 5,954,657 | A | 9/1999 | Rados | |
| 5,957,166 | A | 9/1999 | Safabash | |
| 5,957,314 | A * | 9/1999 | Nishida | B65D 45/322 220/257.1 |
| 5,963,136 | A | 10/1999 | O'Brien | |
| 5,983,596 | A | 11/1999 | Corniani et al. | |
| 5,989,227 | A | 11/1999 | Vetter et al. | |
| 5,993,437 | A | 11/1999 | Raoz | |
| 6,000,548 | A | 12/1999 | Tsals | |
| D419,671 | S | 1/2000 | Jansen | |
| 6,021,824 | A | 2/2000 | Larsen et al. | |
| 6,027,482 | A | 2/2000 | Imbert | |
| 6,068,614 | A | 5/2000 | Kimber et al. | |
| D430,293 | S | 8/2000 | Jansen | |
| 6,112,951 | A | 9/2000 | Mueller | |
| D431,864 | S | 10/2000 | Jansen | |
| 6,126,640 | A | 10/2000 | Tucker et al. | |
| 6,190,364 | B1 | 2/2001 | Imbert | |
| 6,193,688 | B1 | 2/2001 | Balestracci et al. | |
| 6,196,593 | B1 | 3/2001 | Petrick et al. | |
| 6,196,998 | B1 | 3/2001 | Jansen et al. | |
| 6,216,885 | B1 | 4/2001 | Guillaume | |
| 6,235,376 | B1 | 5/2001 | Miyazaki et al. | |
| 6,279,746 | B1 | 8/2001 | Hussaini et al. | |
| 6,280,418 | B1 | 8/2001 | Reinhard et al. | |
| 6,287,671 | B1 | 9/2001 | Bright et al. | |
| 6,322,543 | B1 | 11/2001 | Singh et al. | |
| 6,325,227 | B1 | 12/2001 | Ekkert | |
| 6,338,200 | B1 | 1/2002 | Baxa et al. | |
| 6,358,241 | B1 | 3/2002 | Shapeton et al. | |
| 6,375,640 | B1 | 4/2002 | Teraoka | |
| 6,394,983 | B1 | 5/2002 | Mayoral et al. | |
| 6,439,276 | B1 | 8/2002 | Wood et al. | |
| 6,485,460 | B2 | 11/2002 | Eakins et al. | |
| 6,488,666 | B1 | 12/2002 | Geist | |
| 6,491,665 | B1 | 12/2002 | Vetter et al. | |
| 6,500,155 | B2 | 12/2002 | Sasso | |
| 6,520,935 | B1 | 2/2003 | Jansen et al. | |
| 6,540,697 | B2 | 4/2003 | Chen | |
| 6,565,529 | B1 | 5/2003 | Kimber et al. | |
| 6,581,792 | B1 | 6/2003 | Limanjaya | |
| 6,585,691 | B1 * | 7/2003 | Vitello | A61M 5/3202 215/250 |
| 6,592,251 | B2 | 7/2003 | Edwards et al. | |
| 6,666,852 | B2 | 12/2003 | Niedospial, Jr. | |
| 6,682,798 | B1 | 1/2004 | Kiraly | |
| 6,726,652 | B2 | 4/2004 | Eakins et al. | |
| 6,726,672 | B1 | 4/2004 | Hanly et al. | |
| 6,764,469 | B2 | 7/2004 | Broselow | |
| 6,796,586 | B2 | 9/2004 | Werth | |
| 6,821,268 | B2 | 11/2004 | Balestracci | |
| D501,549 | S | 2/2005 | McAllister et al. | |
| 6,921,383 | B2 | 7/2005 | Vitello | |
| 6,935,560 | B2 | 8/2005 | Andreasson et al. | |
| 6,942,643 | B2 | 9/2005 | Eakins et al. | |
| 6,961,638 | B2 | 11/2005 | Ouellette | |
| 6,991,126 | B2 | 1/2006 | Jackel | |
| 7,036,661 | B2 | 5/2006 | Anthony et al. | |
| 7,055,273 | B2 | 6/2006 | Roshkoff | |
| 7,100,771 | B2 | 9/2006 | Massengale et al. | |
| 7,125,397 | B2 | 10/2006 | Woehr et al. | |
| 7,141,286 | B1 | 11/2006 | Kessler et al. | |
| 7,175,081 | B2 | 2/2007 | Andreasson et al. | |
| 7,182,256 | B2 | 2/2007 | Andreasson et al. | |
| 7,232,066 | B2 | 6/2007 | Anderasson et al. | |
| 7,240,926 | B2 | 7/2007 | Dalle et al. | |
| 7,258,222 | B2 | 8/2007 | Sala et al. | |
| 7,299,981 | B2 | 11/2007 | Hickle et al. | |
| 7,367,964 | B2 | 5/2008 | Heinz et al. | |
| 7,374,555 | B2 | 5/2008 | Heinz et al. | |
| 7,404,500 | B2 | 7/2008 | Marteau et al. | |
| 7,410,803 | B2 | 8/2008 | Nollert et al. | |
| 7,425,208 | B1 | 9/2008 | Vitello | |
| 7,437,972 | B2 | 10/2008 | Yeager | |
| 7,438,704 | B1 | 10/2008 | Kawashima et al. | |
| D581,046 | S | 11/2008 | Sudo | |
| D581,047 | S | 11/2008 | Koshidaka | |
| D581,049 | S | 11/2008 | Sudo | |
| 7,482,166 | B2 | 1/2009 | Nollert et al. | |
| D589,612 | S | 3/2009 | Sudo | |
| 7,497,330 | B2 | 3/2009 | Anthony et al. | |
| 7,503,453 | B2 | 3/2009 | Cronin et al. | |
| 7,588,563 | B2 | 9/2009 | Guala | |
| 7,594,681 | B2 | 9/2009 | DeCarlo | |
| 7,608,057 | B2 | 10/2009 | Woehr et al. | |
| 7,611,487 | B2 | 11/2009 | Woehr et al. | |
| 7,632,244 | B2 | 12/2009 | Buehler et al. | |
| D608,900 | S | 1/2010 | Giraud et al. | |
| 7,641,636 | B2 | 1/2010 | Moesli et al. | |
| D612,939 | S | 3/2010 | Boone, III et al. | |
| 7,681,606 | B2 | 3/2010 | Khan et al. | |
| 7,698,180 | B2 | 4/2010 | Fago et al. | |
| 7,708,035 | B2 | 5/2010 | Windmiller | |
| 7,735,664 | B1 | 6/2010 | Peters et al. | |
| 7,748,892 | B2 | 7/2010 | McCoy | |
| 7,762,988 | B1 | 7/2010 | Vitello | |
| 7,766,919 | B2 | 8/2010 | Delmotte | |
| 7,802,313 | B2 | 9/2010 | Czajka | |
| 7,886,908 | B2 | 2/2011 | Farrar et al. | |
| 7,918,830 | B2 | 4/2011 | Langan et al. | |
| 7,922,213 | B2 | 4/2011 | Werth | |
| 7,988,004 | B1 | 8/2011 | Marret et al. | |
| 8,034,041 | B2 | 10/2011 | Domkowski et al. | |
| 8,079,518 | B2 | 12/2011 | Turner et al. | |
| 8,091,727 | B2 | 1/2012 | Domkowwski | |
| 8,118,788 | B2 | 2/2012 | Frezza | |
| 8,120,484 | B2 | 2/2012 | Chisholm | |
| 8,128,605 | B2 | 3/2012 | Masi et al. | |
| 8,137,324 | B2 | 3/2012 | Bobst | |
| 8,140,349 | B2 | 3/2012 | Hanson et al. | |
| 8,151,970 | B2 | 4/2012 | McDonald et al. | |
| 8,231,585 | B2 | 7/2012 | Heinz et al. | |
| 8,252,247 | B2 | 8/2012 | Ferlic | |
| 8,257,286 | B2 | 9/2012 | Meyer et al. | |
| 8,328,082 | B1 | 12/2012 | Bochenko et al. | |
| 8,348,895 | B1 | 1/2013 | Vitello | |
| 8,353,869 | B2 | 1/2013 | Ranalletta et al. | |
| 8,413,410 | B2 | 4/2013 | Ulm et al. | |
| 8,413,811 | B1 | 4/2013 | Arendt | |
| 8,443,999 | B1 | 5/2013 | Reinders | |
| D684,057 | S | 6/2013 | Kwon | |
| 8,512,277 | B2 | 8/2013 | Del Vecchio | |
| 8,528,757 | B2 | 9/2013 | Bisio | |
| 8,556,074 | B2 | 10/2013 | Turner et al. | |
| 8,579,116 | B2 | 11/2013 | Pether et al. | |
| 8,591,462 | B1 | 11/2013 | Vitello | |
| 8,597,255 | B2 | 12/2013 | Emmott et al. | |
| 8,597,271 | B2 | 12/2013 | Langan et al. | |
| 8,616,413 | B2 | 12/2013 | Koyama | |
| D701,304 | S | 3/2014 | Lair et al. | |
| 8,672,902 | B2 | 3/2014 | Ruan et al. | |
| 8,702,674 | B2 | 4/2014 | Bochenko | |
| 8,777,910 | B2 | 7/2014 | Bauss et al. | |
| 8,777,930 | B2 | 7/2014 | Swisher et al. | |
| 8,813,944 | B2 | 8/2014 | Tanner | |
| 8,852,561 | B2 | 10/2014 | Wagner et al. | |
| 8,864,021 | B1 | 10/2014 | Vitello | |
| 8,864,707 | B1 | 10/2014 | Vitello | |
| 8,864,708 | B1 | 10/2014 | Vitello | |
| 8,911,424 | B2 | 12/2014 | Weadock et al. | |
| 8,945,082 | B2 | 2/2015 | Geiger et al. | |
| 8,978,909 | B2 * | 3/2015 | Kakutani | B65D 51/002 215/296 |
| 8,985,305 | B2 | 3/2015 | Wong et al. | |

(56) References Cited

U.S. PATENT DOCUMENTS

| | | | |
|---|---|---|---|
| 9,016,473 | B2 | 4/2015 | Tamarindo |
| 9,027,769 | B2 | 5/2015 | Willows et al. |
| 9,082,157 | B2 | 7/2015 | Gibson |
| 9,095,667 | B2 | 8/2015 | Von Schuckman |
| 9,101,534 | B2 | 8/2015 | Bochenko |
| D738,495 | S | 9/2015 | Strong et al. |
| 9,125,976 | B2 | 9/2015 | Uber, III et al. |
| D743,019 | S | 11/2015 | Schultz |
| 9,192,443 | B2 | 11/2015 | Tennican |
| 9,199,042 | B2 | 12/2015 | Farrar et al. |
| 9,199,749 | B1 | 12/2015 | Vitello et al. |
| 9,220,486 | B2 | 12/2015 | Schweiss et al. |
| 9,220,577 | B2 | 12/2015 | Jessop et al. |
| 9,227,019 | B2 | 1/2016 | Swift et al. |
| D750,228 | S | 2/2016 | Strong et al. |
| 9,272,099 | B2 | 3/2016 | Limaye et al. |
| 9,311,592 | B1 | 4/2016 | Vitello et al. |
| D756,777 | S | 5/2016 | Berge et al. |
| 9,336,669 | B2 | 5/2016 | Bowden et al. |
| D759,486 | S | 6/2016 | Ingram et al. |
| D760,384 | S | 6/2016 | Niunoya et al. |
| D760,902 | S | 7/2016 | Persson |
| 9,402,967 | B1 | 8/2016 | Vitello |
| 9,427,715 | B2 | 8/2016 | Palazzolo et al. |
| 9,433,768 | B2 | 9/2016 | Tekeste et al. |
| 9,463,310 | B1 | 10/2016 | Vitello |
| D773,043 | S | 11/2016 | Ingram et al. |
| 9,480,801 | B2 | 11/2016 | Schiller et al. |
| D777,903 | S | 1/2017 | Schultz |
| 9,662,456 | B2 | 5/2017 | Woehr |
| D789,529 | S | 6/2017 | Davis et al. |
| 9,687,249 | B2 | 6/2017 | Hanlon et al. |
| 9,694,948 | B1 | 7/2017 | Pakhomov et al. |
| 9,744,304 | B2 | 8/2017 | Swift et al. |
| D797,928 | S | 9/2017 | Davis et al. |
| D797,929 | S | 9/2017 | Davis et al. |
| 9,764,098 | B2 | 9/2017 | Hund et al. |
| 9,821,152 | B1 | 11/2017 | Vitello et al. |
| D806,241 | S | 12/2017 | Swinney et al. |
| D807,503 | S | 1/2018 | Davis et al. |
| 9,855,191 | B1 | 1/2018 | Vitello et al. |
| D815,945 | S | 4/2018 | Fischer |
| 9,987,438 | B2 | 6/2018 | Stillson |
| D825,746 | S | 8/2018 | Davis et al. |
| 10,039,913 | B2 | 8/2018 | Yeh et al. |
| D831,201 | S | 10/2018 | Holtz et al. |
| D834,187 | S | 11/2018 | Ryan |
| 10,124,122 | B2 | 11/2018 | Zenker |
| 10,166,343 | B1 | 1/2019 | Hunt et al. |
| 10,166,347 | B1 | 1/2019 | Vitello |
| 10,183,129 | B1 | 1/2019 | Vitello |
| 10,207,099 | B1 | 2/2019 | Vitello |
| 10,207,835 | B2 | 2/2019 | Wilhelm et al. |
| D842,464 | S | 3/2019 | Davis et al. |
| D847,373 | S | 4/2019 | Hurwit et al. |
| 10,293,987 | B2 | 5/2019 | Sattig et al. |
| 10,300,263 | B1 | 5/2019 | Hunt |
| 10,307,548 | B1 | 6/2019 | Hunt et al. |
| 10,315,024 | B1 | 6/2019 | Vitello et al. |
| 10,315,808 | B2 | 6/2019 | Taylor et al. |
| 10,376,655 | B2 | 8/2019 | Pupke et al. |
| D859,125 | S | 9/2019 | Weagle et al. |
| 10,478,262 | B2 | 11/2019 | Niese et al. |
| 10,555,872 | B1 | 2/2020 | Thorne |
| 10,618,711 | B2 | 4/2020 | Weir |
| 10,695,490 | B2 | 6/2020 | Perazzo et al. |
| 10,758,684 | B1 | 9/2020 | Vitello et al. |
| 10,759,611 | B1 | 9/2020 | Kalm |
| 10,773,067 | B2 | 9/2020 | Davis et al. |
| 10,800,556 | B2 | 10/2020 | Thorne et al. |
| D903,865 | S | 12/2020 | Banik et al. |
| 10,888,672 | B1 | 1/2021 | Vitello |
| 10,898,659 | B1 | 1/2021 | Vitello et al. |
| 10,912,898 | B1 | 2/2021 | Vitello et al. |
| 10,933,202 | B1 | 3/2021 | Banik |
| 10,940,087 | B2 | 3/2021 | Thorne et al. |
| 10,953,162 | B1 | 3/2021 | Hunt et al. |
| 11,040,149 | B1 | 6/2021 | Banik |
| 11,040,154 | B1 | 6/2021 | Vitello et al. |
| 11,065,181 | B2 | 7/2021 | Davis et al. |
| 11,097,071 | B1 | 8/2021 | Hunt et al. |
| 11,168,818 | B2 | 11/2021 | Fangrow |
| 11,254,514 | B2 | 2/2022 | Vienot et al. |
| 11,278,681 | B1 | 3/2022 | Banik et al. |
| D948,713 | S | 4/2022 | Banik |
| 11,357,588 | B1 | 6/2022 | Vitello et al. |
| 11,413,406 | B1 | 8/2022 | Vitello et al. |
| 11,426,328 | B1 | 8/2022 | Ollmann et al. |
| 11,471,610 | B1 | 10/2022 | Banik et al. |
| 11,523,970 | B1 | 12/2022 | Vitello et al. |
| 11,541,180 | B1 | 1/2023 | Vitello et al. |
| 11,690,994 | B1 | 7/2023 | Banik et al. |
| 11,697,527 | B1 | 7/2023 | Hendren et al. |
| 11,779,520 | B1 | 10/2023 | Vitello |
| 11,793,987 | B1 | 10/2023 | Vitello et al. |
| 11,850,210 | B2 | 12/2023 | Dadachanji et al. |
| 11,857,751 | B1 | 1/2024 | Vitello |
| 11,872,187 | B1 | 1/2024 | Vitello et al. |
| 11,904,149 | B1 | 2/2024 | Vitello et al. |
| 11,911,339 | B1 | 2/2024 | Lehel et al. |
| 12,070,591 | B1 | 8/2024 | Vitello |
| 12,172,803 | B1 | 12/2024 | Vitello et al. |
| 12,195,241 | B1 | 1/2025 | Vitello et al. |
| 12,201,230 | B2 | 1/2025 | Bell |
| 12,383,463 | B1 | 8/2025 | Vitello et al. |
| 12,478,449 | B1 | 11/2025 | Vitello et al. |
| 12,545,483 | B1 | 2/2026 | Vitello et al. |
| 2001/0003150 | A1 | 6/2001 | Imbert |
| 2001/0034506 | A1 | 10/2001 | Hirschman et al. |
| 2001/0041866 | A1 | 11/2001 | Capes et al. |
| 2001/0056258 | A1 | 12/2001 | Evans |
| 2002/0007147 | A1 | 1/2002 | Capes et al. |
| 2002/0023409 | A1 | 2/2002 | Py |
| 2002/0046962 | A1 | 4/2002 | Vallans et al. |
| 2002/0079281 | A1 | 6/2002 | Hierzer et al. |
| 2002/0097396 | A1 | 7/2002 | Schafer |
| 2002/0099334 | A1 | 7/2002 | Hanson et al. |
| 2002/0101656 | A1 | 8/2002 | Blumenthal et al. |
| 2002/0104770 | A1 | 8/2002 | Shapeton et al. |
| 2002/0133119 | A1 | 9/2002 | Eakins et al. |
| 2002/0188259 | A1 | 12/2002 | Hickle et al. |
| 2003/0041560 | A1 | 3/2003 | Kemnitz |
| 2003/0055685 | A1 | 3/2003 | Cobb et al. |
| 2003/0146617 | A1 | 8/2003 | Franko, Sr. |
| 2003/0183547 | A1 | 10/2003 | Heyman |
| 2003/0187403 | A1 | 10/2003 | Balestracci |
| 2004/0008123 | A1 | 1/2004 | Carrender et al. |
| 2004/0011623 | A1 | 1/2004 | Sala |
| 2004/0064095 | A1 | 4/2004 | Vitello |
| 2004/0116858 | A1 | 6/2004 | Heinz et al. |
| 2004/0129738 | A1 | 7/2004 | Stukas |
| 2004/0173563 | A1 | 9/2004 | Kim et al. |
| 2004/0186437 | A1 | 9/2004 | Frenette et al. |
| 2004/0225258 | A1 | 11/2004 | Balestracci |
| 2005/0146081 | A1 | 7/2005 | MacLean et al. |
| 2005/0148941 | A1 | 7/2005 | Farrar et al. |
| 2005/0209555 | A1 | 9/2005 | Middleton et al. |
| 2006/0049948 | A1 | 3/2006 | Chen et al. |
| 2006/0084925 | A1 | 4/2006 | Ramsahoye |
| 2006/0089601 | A1 | 4/2006 | Dionigi |
| 2006/0169611 | A1 | 8/2006 | Prindle |
| 2006/0173415 | A1 | 8/2006 | Cummins |
| 2006/0189933 | A1 | 8/2006 | Alheidt et al. |
| 2007/0060898 | A1 | 3/2007 | Shaughnessy et al. |
| 2007/0106234 | A1 | 5/2007 | Klein |
| 2007/0142786 | A1 | 6/2007 | Lampropoulos et al. |
| 2007/0191690 | A1 | 8/2007 | Hasse et al. |
| 2007/0219503 | A1 | 9/2007 | Loop et al. |
| 2007/0257111 | A1 | 11/2007 | Ortenzi |
| 2008/0068178 | A1 | 3/2008 | Meyer |
| 2008/0078146 | A1 | 4/2008 | Cirio |
| 2008/0097310 | A1 | 4/2008 | Buehler et al. |
| 2008/0106388 | A1 | 5/2008 | Knight |
| 2008/0140020 | A1 | 6/2008 | Shirley |

(56) References Cited

U.S. PATENT DOCUMENTS

2008/0243088 A1 10/2008 Evans
2008/0302711 A1 12/2008 Windmiller
2008/0303267 A1 12/2008 Schnell et al.
2008/0306443 A1 12/2008 Neer
2009/0008356 A1 1/2009 Gadzic et al.
2009/0062744 A1 3/2009 Weilbacher et al.
2009/0084804 A1 4/2009 Caspary et al.
2009/0099552 A1 4/2009 Levy et al.
2009/0149815 A1 6/2009 Kiel et al.
2009/0166311 A1 7/2009 Claessens
2009/0212954 A1 8/2009 Adstedt et al.
2009/0326481 A1 12/2009 Swisher et al.
2010/0050351 A1 3/2010 Colantonio et al.
2010/0051491 A1 3/2010 Lampropoulos et al.
2010/0084403 A1 4/2010 Popish et al.
2010/0089862 A1 4/2010 Schmitt
2010/0126894 A1 5/2010 Koukol et al.
2010/0179822 A1 7/2010 Reppas
2010/0211016 A1 8/2010 Palmer-Felgate
2010/0228226 A1 9/2010 Nielsen
2010/0252564 A1 10/2010 Martinez et al.
2010/0283238 A1 11/2010 Deighan et al.
2010/0307108 A1 12/2010 Sink et al.
2011/0009836 A1 1/2011 Chebli et al.
2011/0044850 A1 2/2011 Solomon et al.
2011/0046550 A1 2/2011 Schiller et al.
2011/0046603 A1 2/2011 Felsovalyi et al.
2012/0064515 A2 3/2012 Knapp et al.
2012/0096957 A1 4/2012 Ochman
2012/0110950 A1 5/2012 Schraudolph
2013/0018356 A1 1/2013 Prince et al.
2013/0018536 A1 1/2013 Prince et al.
2013/0037383 A1 2/2013 Iwasa et al.
2013/0056130 A1 3/2013 Alpert et al.
2013/0088354 A1 4/2013 Thomas
2013/0145725 A1 6/2013 Bianco et al.
2013/0237949 A1 9/2013 Miller
2013/0269592 A1 10/2013 Heacock et al.
2014/0000781 A1 1/2014 Franko, Jr.
2014/0034536 A1 2/2014 Reinhardt et al.
2014/0069202 A1 3/2014 Fisk
2014/0069829 A1 3/2014 Evans
2014/0076840 A1 3/2014 Graux et al.
2014/0135738 A1 5/2014 Panian
2014/0155868 A1 6/2014 Nelson et al.
2014/0163465 A1 6/2014 Bartlett, II et al.
2014/0257843 A1 9/2014 Adler et al.
2014/0319141 A1 10/2014 Stratis et al.
2014/0326727 A1 11/2014 Jouin et al.
2014/0353196 A1 12/2014 Key
2014/0358078 A1 12/2014 Fischer et al.
2015/0013811 A1 1/2015 Carrel et al.
2015/0048045 A1* 2/2015 Miceli .................... B65D 41/04 215/201
2015/0112296 A1 4/2015 Ishiwata et al.
2015/0136632 A1 5/2015 Moir et al.
2015/0182686 A1 7/2015 Okihara
2015/0191633 A1 7/2015 De Boer et al.
2015/0246185 A1 9/2015 Heinz
2015/0251820 A1 9/2015 Glaser et al.
2015/0298414 A1* 10/2015 Dittmer .............. B29D 99/0096 156/242
2015/0302232 A1 10/2015 Strassburger et al.
2015/0305982 A1 10/2015 Bochenko
2015/0310771 A1 10/2015 Atkinson et al.
2016/0067144 A1 3/2016 Chang
2016/0067422 A1 3/2016 Davis et al.
2016/0090456 A1 3/2016 Ishimaru et al.
2016/0136352 A1 5/2016 Smith et al.
2016/0144119 A1 5/2016 Limaye et al.
2016/0158110 A1 6/2016 Swisher et al.
2016/0158449 A1 6/2016 Limaye et al.
2016/0176550 A1 6/2016 Viitello et al.
2016/0194121 A1* 7/2016 Ogawa ...................... A61J 1/05 215/249
2016/0250420 A1 9/2016 Maritan et al.
2016/0279032 A1 9/2016 Davis
2016/0328586 A1 11/2016 Bowden et al.
2016/0361235 A1 12/2016 Swisher
2016/0367439 A1 12/2016 Davis et al.
2017/0007771 A1 1/2017 Duinat et al.
2017/0014310 A1 1/2017 Hyun et al.
2017/0124289 A1 5/2017 Hasan et al.
2017/0173321 A1 6/2017 Davis et al.
2017/0203086 A1 7/2017 Davis
2017/0225843 A1 8/2017 Glaser et al.
2017/0239141 A1 8/2017 Davis et al.
2017/0297781 A1 10/2017 Kawamura
2017/0319438 A1 11/2017 Davis et al.
2017/0328758 A1 11/2017 Fuchs
2017/0349335 A1 12/2017 Sattig et al.
2017/0354792 A1 12/2017 Ward
2018/0001540 A1 1/2018 Byun
2018/0014998 A1 1/2018 Yuki et al.
2018/0064604 A1 3/2018 Drmanovic
2018/0078684 A1 3/2018 Peng et al.
2018/0089593 A1 3/2018 Patel et al.
2018/0098915 A1 4/2018 Rajagopal et al.
2018/0147115 A1 5/2018 Nishioka et al.
2018/0236177 A1 8/2018 Schraga
2018/0312305 A1 11/2018 Rognard
2019/0275313 A1 9/2019 Godin et al.
2019/0308006 A1 10/2019 Erekovcanski et al.
2019/0388626 A1 12/2019 Okihara
2021/0228445 A1* 7/2021 Bouteloup ............ A61J 1/2089
2021/0244892 A1 8/2021 Maritan et al.
2022/0008645 A1 1/2022 Ukai et al.
2022/0024630 A1 1/2022 Bohamed
2022/0257467 A1* 8/2022 Yano ..................... A61J 1/1468
2022/0296470 A1* 9/2022 Wagner .................. B65D 51/18
2022/0339067 A1 10/2022 Christine et al.
2023/0036805 A1* 2/2023 Rey ........................... B67C 7/00

FOREIGN PATENT DOCUMENTS

DE 102020123373 3/2020
DE 102020123392 3/2022
DE 102020131870 6/2022
EP 0148116 7/1985
EP 269920 6/1988
EP 571980 12/1993
EP 2724977 4/2014
EP 2937616 10/2015
GB 486367 6/1938
GB 2102774 2/1983
JP 08002544 1/1996
JP 2014076618 5/2014
KR 101159987 6/2012
KR 101868822 * 6/2018
WO WO8607040 12/1986
WO WO-9118801 A1 * 12/1991 ......... B65D 41/3447
WO WO1992003348 3/1992
WO WO2008000279 1/2008
WO WO2017086607 5/2015
WO WO2025003684 1/2025

* cited by examiner

FIG. 1
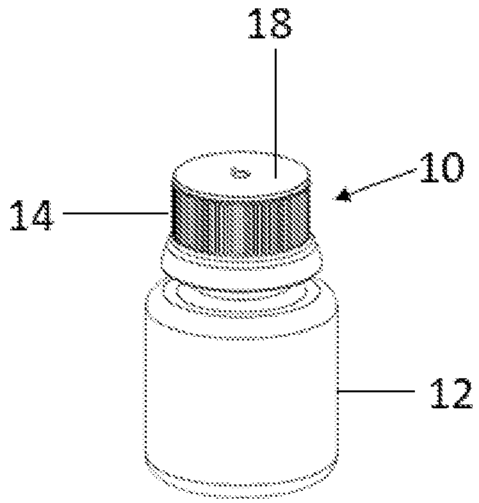
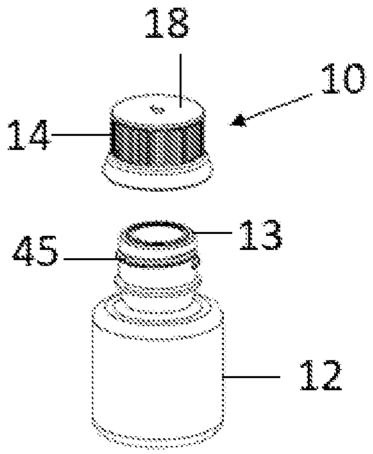
FIG. 2

FIG. 3
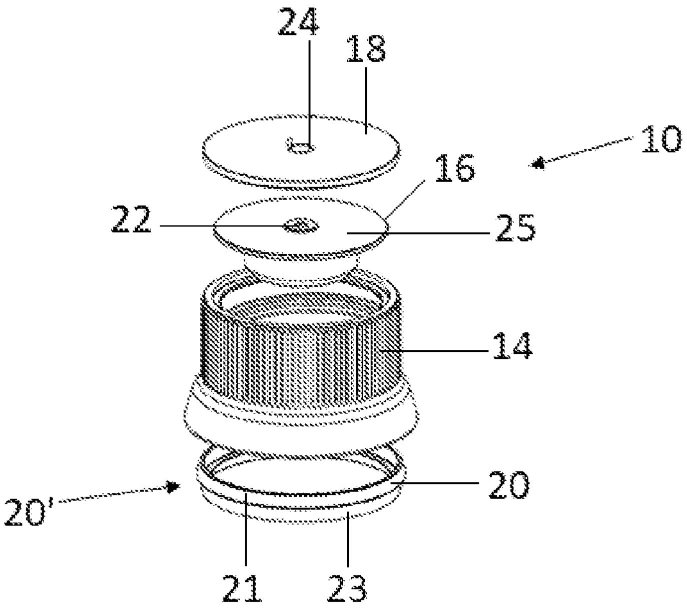
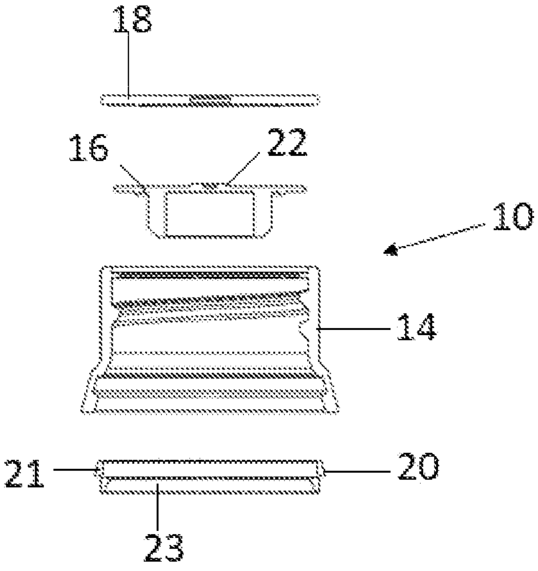
FIG. 4

Fig. 6
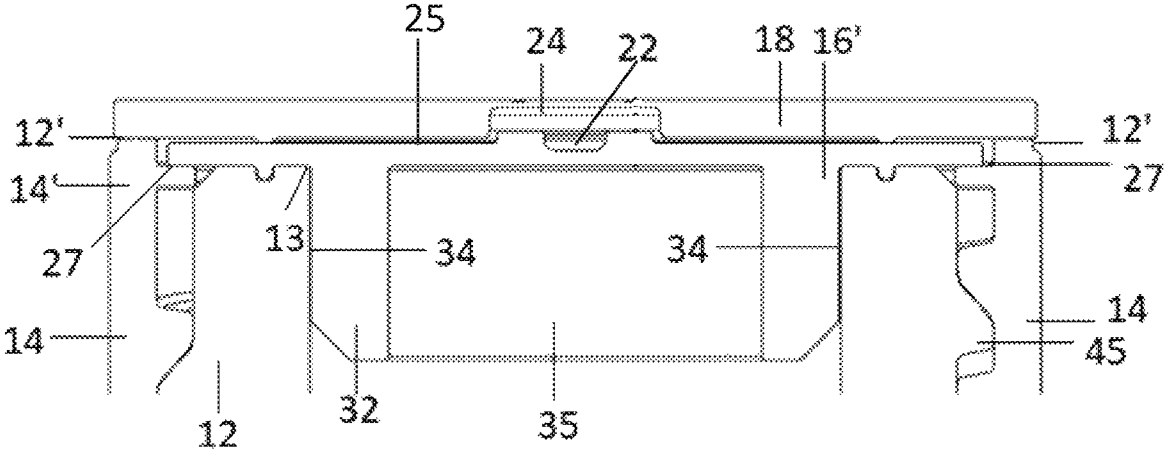
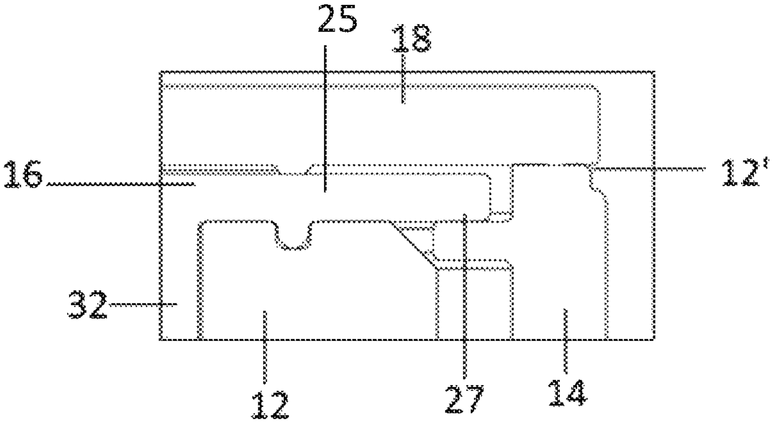
FIG. 7

FIG. 8
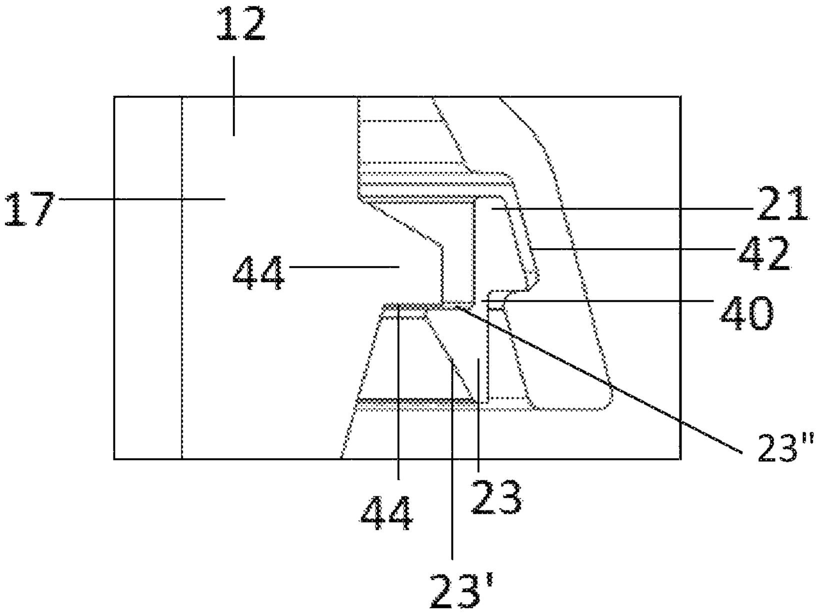
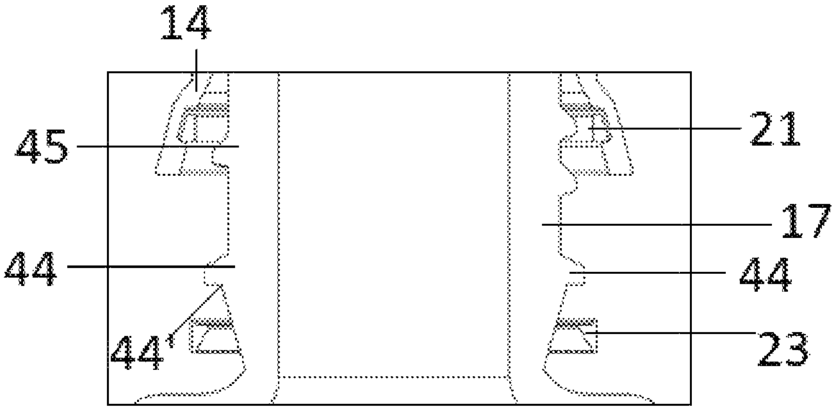
FIG. 9

TAMPER EVIDENT VIAL CLOSURE ASSEMBLY

CLAIM OF PRIORITY

The present application is based on, and a claim of priority is made under 35 U.S.C. Section 119(e) to a provisional patent application that is currently pending in the U.S. Patent and Trademark Office, namely, that having Ser. No. 63/413,492 and a filing date of Oct. 5, 2022, and which is incorporated herein by reference in its entirety.

BACKGROUND OF THE INVENTION

Field of the Invention

This invention is directed to a closure assembly for a vial including a cap, a septum, a seal member and an indicator member, each formed as a unitary, one-piece component, which are collectively interconnected into an operative assembly prior to mounting on the vial. Structural and operative features of the closure assembly include tamper evident capabilities, which provide a visual and/or tactile indication of attempted or accomplished access to the contents of the vial.

Description of the Related Art

In the medical field, it is relatively common procedure to administer fluids to a patient by syringes, intravenous infusion (IV), etc. Such administration devices or assemblies are useful in the treatment of a number of medical conditions because a variety of fluids and/or medications can be administered to a patient utilizing such assemblies. By way of example, it is common for medical personnel to order that a patient be given a medication by injection. However, there are a number of safety issues associated with administering injections. One concern relates to avoiding contamination by bacteria, germs, or other harmful organisms. Because of this, and also due to the potential for theft of the medication and/or tampering in order to access the medication, one important concern relates to minimizing the number of people handling syringes. This concern is perhaps even more pronounced with regard to pre-filled syringes.

More specifically it is relatively common in a number of hospital settings for a number of syringes to be pre-loaded or pre-filled with certain medications by pharmacists or other authorized personnel, at an appropriate location, for subsequent dispensing of such prefilled syringes to one or more nursing stations or distribution areas and then, subsequently to the patient for direct use. The pharmacy or location where syringes are filled are often located in a remote part of the health facility relative to the location of the patient and the site of administration of the injection. From the foregoing, it may be understood that during the course of loading a syringe with a drug, and also afterwards when a prefilled syringe is delivered to a nurse's station, the syringe can easily be handled by a number of different individuals. This, in turn, increases the chance for the syringe to become contaminated which in turn, could possibly result in introduction of a contaminated substance into the body tissues of a patient. Consequently, a high level of importance is associated with maintaining the sterility of a syringe, from the time of it being filled to the time of injection administration.

Also, in the case of a very expensive drug or addictive drug such as, but not limited to, morphine, there is some danger that a prefilled syringe will be tampered with by person seeking to improperly gain access to the drug. A resulting danger also exists in the possibility of a saline solution or other substance being substituted for a dose of the medication intended to be administered. This could have extremely serious consequences to the patient, possibly including death. Therefore, the growing use of prefilled syringes raises problems relating to the determination of whether a prefilled syringe has been tampered with and and/or exposed to contamination. In order to address such problems, there is a need in the medical field for closures for syringes and/or other medical containers or administering devices, which maintain sterility while providing sufficient assurances that the contents of the syringe, medical container, administering devices, etc. have not been compromised.

Accordingly, tamper evident capabilities and/or structures associated with medical closures, covers, caps, etc. are important to protect the integrity of prefilled syringes, as well as other types of medical containers. Thus, and as a further example, vials are often filled with a previously prepared medication and are utilized in combination with a syringe. In use, the needle of the syringe penetrates and passes through a septum and into the interior of vial to establish access to the medication contained therein. As is well recognized in the medical profession, vials are medical containers recognized by appropriate governmental bodies and/or legislation (e.g., 503b) and hospital pharmacies for the containment of medications such as, but not limited to, medication prepared for the distribution of vaccines. As such, the open-end or access opening of the vial include a lid crimped or otherwise secured to the open end of the vial, wherein a penetrable septum may be structured as part of the vial lid.

In many cases, vials contain more than one dose of the contained medication or drug. After the first use, medical personnel commonly use tape placed over the septum and other portions of the vial lid to protect the contents of the vial. In other instances, and by way of example, a vial lid can also be utilized with a chemo vent needle, which is used to reconstitute medication at the hospital pharmacy. More specifically, vials used for chemotherapy drugs may contain a powder material. In order to accomplish conversion to a final drug it must be reconstituted, which in turn may involve breaking the original vial lid. To practice the aforementioned procedure, needles are required to prevent any toxic fumes escaping during the preparation and/or conversion. Once preparation is complete, an additional closure, cover, seal, etc. can be applied to the fully converted or prepared medication.

In order to address the problems and disadvantages of the type set forth above, especially with regard to protecting the contents of a vial containing one or more doses and/or the aforementioned chemotherapy medication, there is a need in the medical profession and related supply industries for a cover type seal structured to be secured to the vial and/or lid or cover of the vial in a manner which closes or seals the septum associated with the vial lid or cover. In addition, if any such proposed seal structure were developed, it would preferably also include tamper evident capabilities and/or structure which provides clear evidence that authorized or unauthorized prior access to the vial has been attempted.

SUMMARY OF THE INVENTION

The present invention is directed to a tamper evident closure assembly for a vial or like container, wherein the structural and operative features of the closure assembly, once mounted on the vial, provide a clear indication of tampering in the form of attempted or realized access to the vial contents.

The closure assembly includes a cap, a septum, a seal member and an indicator member, all operatively interconnected into a sub-assembly which, is mounted on the vial in fluid sealing relation to a primary opening of the vial. Therefore, as practically applied the closure assembly is provided separately or independently of the vial, thereby allowing personnel to fill the vial with appropriate contents and subsequently attach the closure assembly to the vial opening in the intended manner. Further, each of the cap, septum, seal member and indicator member may be manufactured or formed as a single, unitary one-piece construction, using injection molding or other appropriate manufacturing techniques.

As assembled and practically applied, the septum is connected to the cap and includes an access portion structured to facilitate penetration of a needle there through into fluid communication with the contents of the vial. A seal member includes a seal portion disposed in removable sealing relation to at least the penetrable access portion of the septum so as to initially prevent or restrict access to the access portion and the vial contents, by a penetrating needle. As explained in greater detail hereinafter, the seal portion of the seal member is removably connected to the remainder of the seal member and in at least one embodiment may include a peel tab. As such, the seal portion is structured for permanent detachment from the remainder of the seal member thereby providing exposure of the access portion of the septum and preventing reattachment or re-securement of the seal portion to the remainder of the seal member. Accordingly, absence of the peel tab or other seal portion provides a clear indication of tampering.

In at least one embodiment, the seal portion is disposed in overlying, covering and axially aligned relation to the penetrable access portion of the septum and has a lesser dimension or transverse dimension than the remainder of a head portion of the septum. Therefore, upon removal of the seal portion, such as when it is in the form of a peel tab, a remainder of the seal member May remain attached to the cap in covering, overlying relation to correspondingly disposed, underlying portions of the septum. In contrast, the present invention may also be structured to dimension and/or configure the peel tab or other form of the seal portion to extend outwardly from the penetrable access portion of the septum. In such alternative embodiments, removal of the peel tab, may serve to remove or be integrated in a greater portion of the seal member including, but not limited to, a majority thereof. As result, the access portion of the septum, as well as surrounding surface areas may also be exposed.

Additional features of the closure assembly include the septum comprising the aforementioned head having a flat or disk-like configuration, wherein the outer perimeter thereof is secured in appropriate fashion to one end of the cap. In such a fixed position, the septum will effectively define a closed-end of the cap and the aforementioned seal member will be disposed in overlying covering relation to the immediately underlying surface of the septum, as well as the penetrable needle access portion. The septum also includes a base extending outwardly from an undersurface of the head of the septum. Further the base is dimensioned and configured to fit within the primary access opening of the vial in fluid sealing engagement with the interior surfaces thereof. As result, the cover assembly may be mounted on the vial in closing, at least partially fluid sealing relation to the vial opening, thereby preventing or restricting leakage of the vial contents through the vial access opening.

The interior of the base is open or at least partially hollow and is located in generally aligned relation to the access portion of the septum. As result, a needle passing through the penetrable access portion will pass through the hollow or open interior of the base of the septum into fluid communication with the vial contents. Therefore, passage of the needle through the septum, via the access portion, will encounter minimum resistance due to the fact that the needle need only penetrate into and through the penetrable access portion rather than a solid portion of the base of the septum. Moreover, the access portion is formed of a material which accommodates needle penetration there through, while having inherent memory or sealing characteristics which facilitate closure and/or sealing of the needle path once the needle is withdrawn.

Yet additional structural features of at least one embodiment of the closure assembly includes the seal member formed of a plastic material having a flat and/or disk-like configuration. The aforementioned seal portion and/or peel tab, is initially integrated in the remainder of the seal member, but is structured to be permanently removable therefrom. Such permanent removal prevent prevents or significantly restricts successful reattachment of the peel tab/seal portion in overlying, covering relation to the needle penetrating access portion. As should be apparent, the permanent detachment or inability to reattach the peel tab or other seal portion structure in overlying, covering relation to the access portion of the septum provides a clear indication of tampering and attempted or successful access to the interior of the vial and its contents through needle penetration of the septum. In one embodiment, the outer perimeter of the disk-like seal member may be secured to a rim or correspondingly disposed structure of the vial which surrounds the primary access opening. Such connection may be by ultrasound welding or by other appropriate techniques.

As further indicated, the aforementioned indicator member comprises a first segment or "attached" segment and a second or "retained" segment, wherein the first and second segments are removably connected to one another by an interconnecting weekend or frangible segment. In at least one embodiment, the indicator member is in the form of an indicator ring having a continuously annular configuration. The indicator ring and its annular configuration may be further at least partially defined by the first segment also having a continuously annular configuration disposed in surrounding relation to a neck or adjacent portion of the vial, once the closure assembly is mounted on the vial in the intended manner. Similarly, the annular configuration of the indicator ring also comprises the second segment having a continuously annular configuration. In cooperation therewith, the frangible interconnecting segment, serving to removably interconnect the first and second segments may vary in construction and comprises a substantially solid, annular link or in the alternative a plurality of frangible members. When the interconnecting frangible segment comprises a plurality of frangible members, they may be disposed in spaced relation to one another and collectively positioned along the length of the first and second segments.

When operatively attached to the cap in the intended fashion, the first or "attached" segment is connected and/or disposed on an interior surface portion of the cap. Such connection or disposition of the first segment may include it being at least partially disposed on or within an interior surface recess or groove. Further, the fact that the first segment preferably has a continuous annular configuration, and is at least partially flexible so as to spring or be inherently biased outwardly when compressed, it is maintained within the recess or groove. In such a deposition the first segment May be considered fixedly disposed or captured on the interior surface of the cap. In cooperation therewith, the second or "retained" segment, while attached to the first segment by the frangible interconnecting segment, will extend and be disposed "freely" outwardly from the interior surface of the cap and in at least minimally spaced relation thereto. In such a disposition, the second segment is movable relative to the cap and vial once disconnected from the first segment. However, while the first and second segments remain connected they will be disposed within the interior of the cap in a substantially non-observable relation when the cap is mounted on the bile in the intended manner.

Of further note is that the second segment is disposed, dimensioned and configured to establish and define a snap-fit connection with correspondingly disposed portions of the vial. More specifically the second or retaining portion includes an outer surface having an angled or chamfered configuration which is cooperatively with a retaining portion formed on an exterior surface of the neck or connecting portion of the vial. In at least one embodiment mounting or attachment of the closure assembly to the neck or connecting portion of the vial is accomplished by a rotationally threaded interconnection. As such, the neck or other connecting portion of the vial includes an at least partially threaded configuration including at least one, but more practically a plurality of threads. As a result, the aforementioned retaining portion formed on the vial may or may not be defined by a thread or other outwardly projecting rib. Therefore, when the cap is initially threaded onto the vial, the exterior surface of the second segment will move or slide over the connecting portion of the vial and movably and slidingly engage the outwardly projecting retaining portion on the aforementioned exterior surface of the vial. The aforementioned interconnecting frangible segment is further structured to have predetermined flexible characteristics thereby further facilitating the sliding engagement of the outer surface of the second segment over and somewhat beyond the retaining portion on the vial. When so position, the frangible segment further includes sufficient inherent memory to force the second segment back into its original position, resulting in and/or defining a snap-fit connection between the second segment and the retaining portion of the vial.

In addition, to the angled exterior surface, the second segment further includes a blocking surface which also is also cooperatively figured with the retaining portion of the vial so as to be disposed in interruptive, abutting relation and/or engagement there with. Such abutting engagement will prevent or significantly restrict movement of the second segment with the first segment and the cap, when the cap is unthreaded or removed from the vial. In more specific terms, upon removal of the cap from the vial such as by a rotational un-threading, the force exerted on the second segment due to the interruptive, abutting engagement of the second segment with the retaining portion will cause a breakage of the frangible interconnecting segment and a permanent disconnection between the first and second segments. When so disconnected the second segment may pass, under the influence of gravity (assuming the vial and attached closure assembly are in an upright orientation), from the interior of the cap to a position exteriorly below or outward from the cap. In such exteriorly exposed position, the second segment will still be in surrounding, retained relation on the vial. Such movement or disposition of the second segment into the visually exposed position exteriorly of the cap will be another at least visual indication of tampering, at least to the extent that attempts to remove the cap from the neck or connecting portion of the vial will be evident.

Further operative and structural features of the closure assembly include the aforementioned snap-fit connection providing a tactile and possibly audio indication that the second segment has movably engaged the retaining portion on the vial and passed there beyond into the interruptive abutting engagement between the blocking surface of the second segment and a correspondingly disposed portion or surface of the retaining portion.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the closure assembly of the present invention mounted on a vial.

FIG. 2 is a perspective view of the embodiment of FIG. 1 wherein the closure assembly is positioned for mounting on a connecting portion of the vial.

FIG. 3 is a perspective view in exploded form of the structural components of the closure assembly of the embodiment of FIG. 1.

FIG. 4 is an interior sectional view in exploded form of the embodiment of FIG. 3.

FIG. 6 is a detail sectional view in partial cutaway of components of the closure assembly of the embodiment of FIG. 1.

FIG. 7 is a detail sectional view of portions of the embodiment of FIG. 6.

FIG. 8 is a sectional view in partial cutaway of an indicator member of the closure assembly of the embodiment of FIG. 1 mounted on a connecting portion of the vial.

FIG. 9 is a sectional view in detail of an exposed temper indicating disposition of a portion of the indicator member upon removal of the closure assembly from the vial.

Like reference numerals refer to like parts throughout the several views of the drawings.

DETAILED DESCRIPTION OF THE PREFERRED EMBODIMENT

Figure 5:
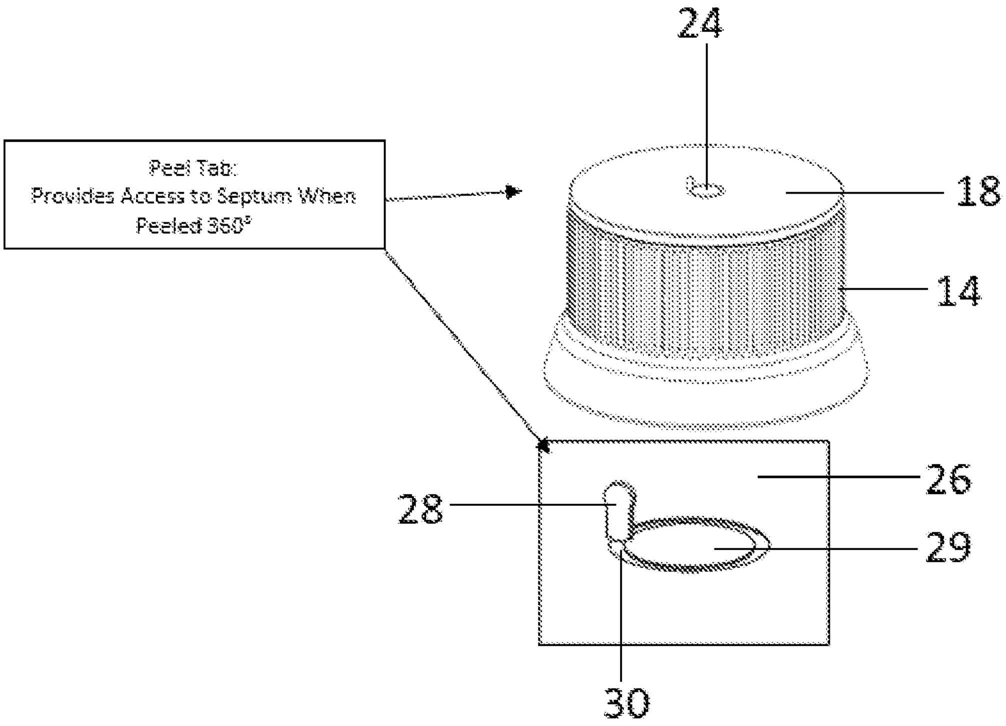
FIG. 5 is a perspective view of the exterior of the closure assembly including a detailed view of a ceiling portion.

The invention now will be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is directed to a tamper evident closure assembly, generally indicated as 10, for a vial 12 or like container specifically including, but not limited to, a medical container. Further, the structural and operative features of the closure assembly 10, once mounted on the vial 12, provide a clear indication of tampering in the form of attempted or realized access to the vial contents. As represented throughout the Figures, the closure assembly 10 includes a cap 14, a septum 16, a seal member 18 and an indicator member 20, all operatively interconnected into a sub-assembly which is mounted on the vial in fluid sealing relation to a primary opening 13 of the vial 12. Therefore, as practically applied, the closure assembly 10 is provided separately or independently of the vial 12, thereby facilitating the filling of the vial 12 with appropriate contents and the subsequent attachment or mounting of the closure assembly 10 enclosing relation to the vial opening 13. Further, each of the cap 14, septum 16, seal member 18 and indicator member 20 may be manufactured or formed as a single, unitary one-piece construction, using injection molding or other appropriate manufacturing techniques.

As assembled and practically applied, the septum 16 is connected to the cap 14 and includes an access portion 22 structured to facilitate penetration of a needle (not shown for purposes of clarity) there-through into fluid communication with the contents of the vial 12. The seal member 18 includes a seal portion 24 disposed in removable sealing relation to at least the penetrable access portion 22 of the septum 16 so as to initially prevent or restrict access to the access portion 22 and the vial contents, by a penetrating needle. As explained in greater detail hereinafter, the seal portion 24 of the seal member 18 is removably connected to the remainder of the seal member 18 and, in at least one embodiment, may include a peel tab 26 represented in detail in FIG. 5. As such, the seal portion 24, 26 is structured for permanent detachment from the remainder of the seal member 18, thereby providing exposure of the access portion 22 of the septum 16 and preventing reattachment or re-securement of the seal portion 24, 26 to the remainder of the seal member 18. Accordingly, absence of the peel tab 26 or other seal portion 24 from the seal member 18 provides a clear indication of tampering.

In more specific terms, and with primary reference to FIG. 5, the peel tab 26 comprises a pull tab 28 disposed, dimensioned and configured to be gripped either manually or by appropriate instrumentation. When so gripped a pulling force may be exerted thereon. As also represented, the peel tab 26 includes a base portion 29 having its periphery surrounded by a seam 30 capable of being torn, ripped, broken, ruptured or otherwise separable from the remainder of the seal member 18 to which is attached, when the aforementioned pulling force is exerted on the pull tab 28. In addition, the rupturable seam 30 is formed of material which is not capable of being reattached to the remainder of the seal member 18. As a result, the base portion 29 of the peel tab 26 is not capable of being otherwise reattached to the remainder of the seal member 18 or otherwise in overlying, covering and/or sealing relation to the access portion 22 of septum 16.

In at least one embodiment, the seal portion 24, whether or not in the form of the peel tab 26, is disposed in overlying, covering and axially aligned relation to the penetrable access portion 22 of the septum 16 and may have a lesser diameter or transverse dimension than the remainder of the seal member 18. Therefore, upon removal of the seal portion 24, whether or not it is in the form of a peel tab 26, a remainder of the seal member 18 may remain intact and attached to the cap 14 in covering, overlying relation to correspondingly disposed, underlying portions of the head 25 of the septum 16. In contrast, the present invention may also be structured, dimensioned and configured such that the peel tab 26 or other form of the seal portion extends outwardly from the penetrable access portion 22 of the septum 16. When so structured, the seal portion 24/26 may be structured to remove and be integrated in a greater portion of the seal member 18 including, but not limited to, a majority thereof. As result, the access portion 22, as well as a greater portion of the surrounding surface area of the head 25 of the septum 16 may also be exposed.

As represented in at least FIGS. 6 and 7, additional features of the closure assembly 10 include the septum 16 comprising the aforementioned head 25 having a flat or disk-like configuration, wherein the outer perimeter thereof is secured in appropriate fashion to one end 14' of the cap 14, as at 27. In such a fixed position, the septum 16 will effectively define a fixed closed-end of the cap 14 and the aforementioned seal member 18 will be disposed in overlying covering relation to the underlying, confronting surface of the head 25 of the septum 16, as well as the penetrable needle access portion 22. As also represented in at least FIG. 6, the septum 16 also includes a base 32 extending outwardly from an undersurface of the head 25 of the septum 16. Further the base 32 is dimensioned and configured to fit within the primary access opening of the vial 12 in fluid sealing engagement with the interior surfaces of the opening 13, as at 34. As result, the closure assembly 10 may be mounted on the vial 12 in closing, at least partially fluid sealing relation to the vial opening 13, thereby preventing or restricting leakage of the vial contents through the vial access opening 13.

The interior of the base 32 is open or at least partially hollow, as at 35 and is located in generally aligned relation to the access portion 22 of the septum 16. As result, a needle (not shown) passing through the penetrable access portion 22 will pass through the hollow or open interior 35 of the base 32 of the septum 16 into fluid communication with the vial contents. Therefore, passage of the needle through the septum 16, via the access portion 22, will encounter minimum resistance due to the fact that the needle need only penetrate into and through the penetrable access portion 22 rather than a solid portion of the head 25 of the septum 16. Moreover, the access portion 22 is formed of a material which accommodates and/or facilitates needle penetration there through, while having inherent memory or sealing characteristics which facilitate closure and/or sealing of the needle path through the access portion 22, once the needle is withdrawn.

Yet additional structural features of at least one embodiment of the closure assembly includes the seal member 18 formed of a plastic or other appropriate material and having a flat and/or disk-like configuration. The aforementioned seal portion 24 and/or peel tab 26, is initially integrated in the remainder of the seal member 18, but is structured to be permanently removable therefrom, via a rupturing of the seam 30, as set forth herein. Such permanent removal prevents or significantly restricts successful reattachment of the seal portion/peel tab 24/26 in overlying, covering relation to the needle penetrating access portion 22. As also indicated herein, such permanent detachment or inability to reattach the seal portion 24/26 to the seal member 18, in overlying, covering relation to the access portion 22 of the septum 16 provides a clear indication of tampering and attempted or successful access to the interior of the vial 12 and its contents, through needle penetration of the septum 16. As represented in FIGS. 6 and 7, one embodiment of the closure assembly 10 includes the outer perimeter of the disk-like seal member 18 being secured to a rim or correspondingly disposed structure of the vial, as at 12' which surrounds the primary access opening 13. Such connection may be by ultrasound welding or by other appropriate techniques.

With primary reference to FIGS. 8 and 9, the indicator member 20 comprises a first segment or "attached" segment 21 and a second or "retained" segment 23, wherein the first and second segments 21 and 23 respectively are removably connected to one another by an interconnecting weakened or frangible segment 40. In at least one embodiment, the indicator member 20 is in the form of an indicator ring 20' having a continuously annular configuration as represented in at least FIG. 3. The indicator ring 20' and its annular configuration may be further at least partially defined by the first segment 21 also having a continuously annular configuration disposed in surrounding relation to a neck or adjacent connecting portion 17 of the vial 12, once the closure assembly 10 is mounted on the vial 12 in the intended manner, as represented in at least FIG. 8. Similarly, the annular configuration of the indicator ring 20' also comprises the second segment 23 having a continuously annular configuration. In cooperation therewith, the frangible interconnecting segment 40, serving to removably interconnect the first and second segments 21 and 23 may vary in construction and comprises a substantially solid, annular link or in the alternative a plurality of frangible members (not shown). When the interconnecting frangible segment comprises a plurality of frangible members, they may be disposed in spaced relation to one another and collectively positioned along the length of the first and second segments 21 and 23.

Figure 10A:
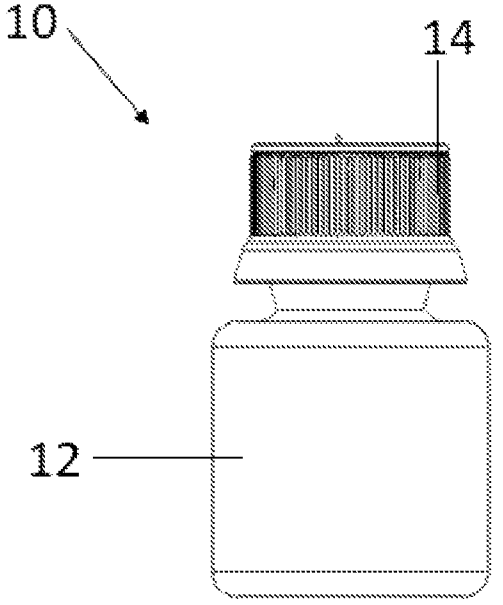
FIG. 10A is an exterior view of the closure assembly being initially mounted on the vial prior to an initial removal of the closure assembly from the vial.

When operatively attached to the cap 14 in the intended fashion represented in FIG. 8, the first or "attached" segment 21 is disposed and/or securely positioned on an interior surface portion of the cap 14. Such connection, disposition or secure positioning of the first segment 21 may include it being at least partially disposed on or within an interior surface recess or groove 42. Further, the fact that the first segment 21 preferably has a continuous annular configuration, and is at least partially flexible so as to be inherently biased outwardly when compressed within the interior of the cap14, it is maintained within the recess or groove 42. In such a deposition the first segment 21 may be considered "fixedly" disposed or captured on the interior surface of the cap 14. In cooperation therewith, the second or "retained" segment 23, while attached to the first segment 21 by the frangible interconnecting segment 40, will extend and be disposed outwardly from the interior surface of the cap 14 as also represented in FIG. 8. As also represented, the second segment 23 will be at least minimally spaced from the interior surface of the cap14 as well as not being fixedly secured to the exterior surface of the connecting portion 17 of the vial 12. In such a disposition, the second segment 23 is movable relative to the cap 14 and vial 12 once disconnected from the first segment 21 as represented in at least FIGS. 9 and 10B. However, while the first and second segments 21 and 23 remain connected they will be disposed within the interior of the cap 14 in a substantially non-observable relation, such as when the cap 14 is initially mounted on the vial 12 in the intended manner, as represented in FIG. 10A.

Of further note is that the second segment 23 is disposed, dimensioned and configured to establish a snap-fit connection with correspondingly disposed retaining portions 44 of the vial 12. More specifically, the second or retained segment 23 includes an outer surface 23' having an angled or chamfered configuration, which is cooperatively configured and disposed relative to the retaining portion 44 formed on an exterior surface of the neck or connecting portion 17 of the vial 12. In at least one embodiment, the mounting of the closure assembly 10 to the neck or connecting portion 17 of the vial 12 is accomplished by a rotationally threaded interconnection. As such, the neck or other connecting portion 17 of the vial 12 includes an at least partially threaded configuration including at least one, but more practically a plurality of threads 45. As a result, the retaining portion 44 formed on the vial 12 at or adjacent to the connecting portion 17 may or may not be defined by a thread 45 or other outwardly projecting rib. Therefore, as represented in FIGS. 8 and 9, when the cap 14 is initially threaded onto the vial 12, the exterior surface 23' of the second segment 23 will rotate over the connecting portion of the vial 12 and movably and slidingly engage the outwardly projecting retaining portion 44. The interconnecting frangible segment 40 is further structured to have predetermined flexible characteristics thereby further facilitating the sliding engagement of the outer surface 23' of the second segment 23 over and somewhat beyond the retaining portion 44 on the connecting portion 17. When in the position represented in FIG. 8, the frangible segment 40 further includes sufficient inherent memory to force the second segment 23 back into its original position. In turn, this results in a snap-fit connection between the second segment 23 and the retaining under surface 44' of the retaining portion 44.

Further operative and structural features of the closure assembly 10 include the aforementioned snap-fit connection, as represented in FIG. 8, providing a tactile and possibly audio indication that the second segment 23 has been disposed in the retaining orientation, relative to the retaining portion 44 by passing at least minimally there beyond into the interruptive abutting engagement between a blocking surface 23" of the second segment 23 and a correspondingly retaining surface or portion 44' on the retaining portion 44.

In addition, to the angled exterior surface 23' of the second segment 23, the second segment 23 also includes the blocking surface 23" which is cooperatively figured and disposed relative to the retaining surface 44' of the retaining portion 44. As a result, the blocking surface 23" on the second segment 23 will be disposed in interruptive, abutting engagement with the retaining surface 44' on the retaining portion 44 upon a rotational un-threading or otherwise removal of the cap 14 from the connecting portion 17 of the vial 12. Such abutting, interruptive engagement will prevent or significantly restrict outward movement of the second segment 23 with the first segment 21 and the cap 14, when the cap 14 is removed from the vial 12. In more specific terms, upon removal of the cap 14 from the vial 12, the force exerted on the second segment 23 due to the interruptive, abutting engagement of the second segment 23 with the retaining portion 44 will cause a breakage of the frangible interconnecting segment 40 and a permanent disconnection between the first and second segments 21 and 23.

Figure 10B:
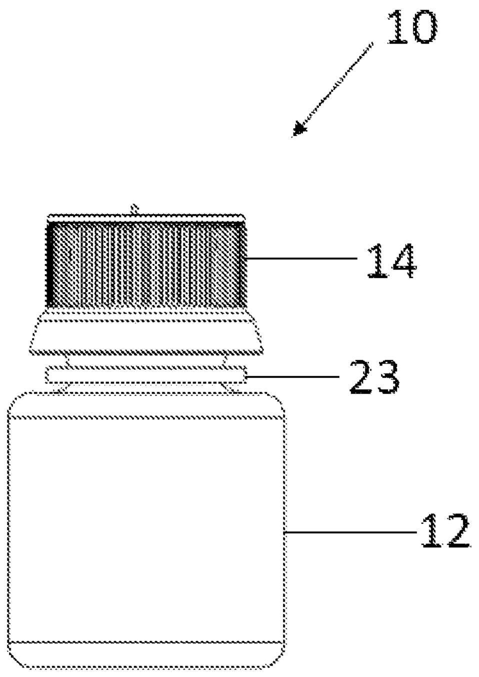
FIG. 10B is an exterior view of a reattached closure assembly on the vial subsequent to initial removal of the closure assembly from the vial.

With reference to FIG. 10B, when the first and second segments 21 and 23 are disconnected, the second segment 23 may move or pass, such as under the influence of gravity, (assuming the vial and attached closure assembly are in an upright orientation), from the interior of the cap 14 to a position exteriorly below or outward from the cap 14. In such exteriorly exposed position represented in FIG. 10B, the second segment 23 will still be in surrounding, retained relation on the vial 12. Such movement or disposition of the second segment 23 into the visually exposed position exteriorly of the cap 14 will be another, at least visual, indication of tampering, at least to the extent that attempts to remove the cap 14 from the neck or connecting portion 17 of the vial 12 will be evident.

Moreover, FIG. 10A represents the closure assembly 10 and vial 12 in respective positions when the closure assembly 10 is originally or initially mounted on the vial 12. In such an initial mounted orientation, the second segment 23 has not yet been disconnected from the first segment 21 and as a result remains on the interior of the cap 14 in a relatively unobserved location. In contrast, once cap 14 has been removed in order to obtain access to the contents of the vial 12, the first and second segments 21 and 23 will be disconnected in the manner set forth in detail above resulting in a passing or moving of the second segments 23 out from within the interior of the cap 14 into the exposed position of FIG. 10B, thereby providing a clear indication of tampering.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A closure assembly for a vial including tamper evident capabilities, said closure assembly comprising:
- a cap and a septum, said septum connected to said cap and including an access portion,
- a seal member connected in overlying, covering relation to said septum,
- said seal member including a seal portion disposed in removably sealing relation to said access portion,
- an indicator member comprising a first segment and a second segment detachably connected to one another,
- said first segment connected to said cap and movable therewith, concurrent to removal of said cap from the vial,
- said second segment movably disposed in a retained position on the vial, and
- said second segment comprises an outer surface configured and disposed to define a movable, snap-fit engagement with a retaining portion of the vial, concurrent to an initial mounting of the cap on the vial.

2. The closure assembly as recited in claim 1 wherein said cap, said septum, said seal member and said indicator member each initially include a one-piece construction and collectively disposed in interconnected relation to one another prior and concurrent to mounting on the vial.

3. The closure assembly as recited in claim 1 wherein said septum includes a base disposed in fluid sealing engagement with the vial.

4. The closure assembly as recited in claim 3 wherein said septum further comprises a head portion connected to said base and extending radially outward therefrom.

5. The closure assembly as recited in claim 1 wherein said seal portion comprises a peel tab permanently separable from a remainder of said seal member.

6. The closure assembly as recited in claim 1 wherein said indicator member further comprises a frangible segment disposed in removably interconnecting relation between said first segment and said second segment.

7. The closure assembly as recited in claim 1 wherein said indicator member comprises an indicator ring having an annular configuration.

8. The closure assembly as recited in claim 1 wherein said first segment includes a continuous, annular configuration, disposed in surrounding relation to the vial, concurrent to said cap mounted on the vial.

9. The closure assembly as recited in claim 1 wherein said second segment includes a continuous, annular configuration movably disposed, within said cap, in surrounding relation to the vial, concurrent to an initial mounting of the cap on the vial.

10. The closure assembly as recited in claim 9 wherein said second segment is disposed exteriorly of the cap, in a visually exposed, tamper evident position on the vial, concurrent to an initial removal of said cap from the vial.

11. A closure assembly for a vial including tamper evident capabilities, said closure assembly comprising:
- a cap and a septum, said septum connected to said cap and including a penetrable access portion,
- said penetrable access portion disposed in communicating, accessible relation to an interior of the vial concurrent to mounting of the cap on the vial,
- an indicator member comprising a first segment and a second segment detachably connected to one another,
- said first segment is secured to said cap and movable therewith, concurrent to removal of said cap from the vial,
- said second segment movably disposed, within an interior of said cap, in a retained position on the vial,
- said second segment comprises an outer surface configured and disposed to define a movable snap-fit engagement with a retaining portion of the vial, concurrent to an initial mounting of the cap on the vial, and
- said second segment disposed exteriorly of the cap, in an exposed, tamper evident position on the vial, concurrent to an initial removal of said cap from the vial.

12. The closure assembly as recited in claim 11 wherein said first segment includes a continuous, annular configuration, disposed in surrounding relation to the vial, concurrent to said cap mounted on the vial.

13. The closure assembly as recited in claim 11 wherein said second segment includes a continuous, annular configuration movably disposed in surrounding relation to the vial, concurrent to an initial mounting of the cap on the vial.

14. The closure assembly as recited in claim 11 further comprising a seal member connected in overlying, covering relation to said septum, said seal member including a seal portion disposed in permanently removable, sealing relation to said penetrable access portion.

15. The closure assembly as recited in claim 11 wherein said indicator member further comprises a frangible segment disposed in removably interconnecting relation between said first segment and said second segment.

* * * * *